United States Patent Office 3,778,479
Patented Dec. 11, 1973

3,778,479
UNSATURATED ALCOHOLS AND DERIVATIVES THEREOF
John J. Morrisroe, Whittier, and Thomas F. Banigan, Arcadia, Calif., assignors to Pilot Chemical Company, Santa Fe Springs, Calif.
No Drawing. Continuation-in-part of abandoned application Ser. No. 687,137, Dec. 1, 1967, which is a continuation-in-part of application Ser. No. 618,824, Feb. 27, 1967, now Patent No. 3,544,603. This application Apr. 19, 1971, Ser. No. 135,428
Int. Cl. C07c *43/00, 43/14*
U.S. Cl. 260—615 B          3 Claims

ABSTRACT OF THE DISCLOSURE

Linear 3-alken-1-ols of from 11 to 15 carbon atoms are formed by reacting formaldehyde and a linear olefin. Compounds exhibiting desirable detergent properties result from sulfation, ethoxylation, ethoxylation and sulfation, or ethoxylation and dihydroxylation of the 3-alken-1-ols.

CROSS-REFERENCE TO RELATED APPLICATIONS

This application is a continuation-in-part of our application Ser. No. 687,137, filed Dec. 1, 1967 and now abandoned, which was in turn a continuation-in-part of our application Ser. No. 618,824, filed Feb. 27, 1967 (now U.S. Pat. 3,544,603). This application is related to the subject matter of our applications Ser. Nos. 84,161 and 84,226, each filed Oct. 26, 1970, as continuations-in-part of said application Ser. No. 618,824, and to our concurrently filed application for 1,3,4-Triols and Derivatives Thereof (Ser. No. 135,427, filed Apr. 19, 1971).

BACKGROUND OF THE INVENTION

In recent years, there has been an increasing demand for synthetic alcohols. These alcohols have a variety of uses, and are especially useful for conversion to detergents. Nonionic detergents, formed by the ethoxylation of linear alcohols, have been very popular in recent years. The growth in the use of nonionics has been due in part to special properties such as whiteness, liquid state, increasing activity with temperature and effectiveness without the requirement for the presence of builders.

A disadvantage in using higher alcohols for various purposes, including preparation of detergents, has been the high cost of the alcohols. With the recent availability of alpha olefins in the detergent range, there have been many efforts to find suitable low cost ways of making detergents directly from the alpha olefins. There are several theoretical methods for doing this, among which can be included oxidation with ozone in order to form the carboxy acid with one less carbon atom than the olefin; sulfation, which gives only the secondary alcohols; high pressure synthesis with carbon monoxide and the oxo reaction to give a primary alcohol and the abnormal reverse addition of hydrogen bromide to the alpha olefin to form a primary bromide which can be hydrolyzed to the primary alcohol. The two most commercially feasible methods appear to be the oxo reaction and the hydrogen bromide reverse addition. The first is marked by the high cost of the high pressure reaction that must be carried out with the carbon monoxide and the second by the difficulty of recovering the bromide in the degraded form from the hydrolysis which produces primary alcohol.

It is also known in the prior art that unsaturated lower alcohols can be obtained from the reaction of a linear olefin and formaldehyde. These unsaturated alcohols have never been investigated in the detergent range and have never been applied for detergent use. Thus, 3-hepten-1-ol is reported in C. Agami, Compt. Rend, 255 (14) 1623, (15) 1753 (1962) and 3-nonadecen-1-ol in N. O. Brace, J. Am. Chem. Soc., 77, 4666 (1955), but no mention is made of detergent efficacy in either case. Butler, in U.S. Pat. 2,624,766, describes and claims the highly branched 3-alken-1-ol triisobutenyl carbinol as useful in detergent employment, but that compound suffers the disadvantage, inter alia, of non-biodegradability, a disability shared in lesser degree by 3-nonadecen-1-ol.

SUMMARY OF THE INVENTION

According to this invention there are provided 3-alken-1-ols of formula

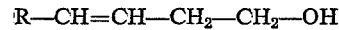

R—CH=CH—CH$_2$—CH$_2$—OH wherein R is a linear alkyl group having from 7 to 11 carbon atoms and also compounds of excellent detergent properties resulting from sulfation, ethoxylation, and ethoxylation followed by hydroxylation or sulfation. The linear alkenol and alkenol derivative compounds of the invention display biodegradability far superior to branched 3-alken-1-ol compounds heretofore recommended for detergent employment.

DETAILED DESCRIPTION OF THE INVENTION

The novel 3-alken-1-ols of this invention are the precursors from which materials having outstanding detergent properties can be prepared. The 3-alkene-1-ols are obtained by the reaction of formaldehyde with an alpha olefin at elevated temperatures.

The linear alpha olefins suitable for use in the present invention include those containing from 10 to 14 carbon atoms, and most preferably contain 12 carbon atoms. The reaction of this invention is appilcable to a single olefin or to a range of olefins having different chain lengths. One source is olefins obtained from cracked wax and especially those refined through molecular sieves. However, the present invention is also applicable to olefins obtained from other sources such as Ziegler buildup, polyethylene cracking, the oxo process, catalytic dehydrogenation of linear paraffins, etc.

The formaldehyde may be introduced into the reaction as such or as paraformaldehyde, trioxymethylene, isomers of trioxymethylene or any other compound which decomposes under the reaction conditions to yield formaldehyde.

The olefin-aldehyde reaction is carried out in the absence of a catalyst at an elevated temperature. In general, the temperature may vary from about 180° to 250° C. Of course, it is possible to use temperatures outside this range. However, at temperatures below about 180° C., the rate of reaction is generally too slow whereas temperatures above about 250° C. result in some degradation and disproportionation of the products, thereby lowering the yield. Preferably, the reaction should be carried out at temperatures between about 210° and 250° C. The reaction can be carried out over a wide range of olefin to aldehyde mole ratios. However, a ratio between about 2:1 and about 0.5:1 has been found preferable.

The reaction may be carried out in the presence of an organic acid containing from about 1 to 6 carbon atoms, e.g., formic acid, propionic, n-butyric, and acetic acid. Acetic acid is preferred and may be used as an acetic acid-acetic anhydride mixture. In this case the acid forms an ester with the alcohol produced and thus, hydrolysis of the ester to the alcohol may be desirable in working up the final product.

The 3-alken-1-ols of this invention can be represented by the formula

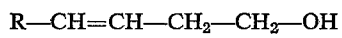

where R is linear alkyl of from 7 to 11 carbon atoms. The size and configuration of R has proved quite critical in the obtainment of the desired detergent properties. Thus, surfactant derivatives of the $C_{11}$-$C_{15}$ alkenols of this invention, when compared to derivatives of the linear $C_7$ and $C_{19}$ alkenols of the prior art show the latter compounds to be greatly depreciated in detergent properties. The same is true as between the linear alkenols of this invention and the aforementioned branched $C_{13}$ alkenol described by Butler.

By ethoxylation in various degrees, the alkenols of the invention can be converted into nonionic detergents having exceptional surface tension-reducing, foaming, and foam reinforcing properties.

The ethoxylation may be carried out by any of the well-known methods of ethoxylating. For example, the product may be reacted with sodium methylate, sodium hydroxide or sodium metal in an inert atmosphere and then exposed to ethylene oxide, e.g., by bubbling ethylene oxide through the liquid at elevated temperatures. Alternatively, acid catalysts such as sulfuric or phosphoric acid may be used. The degree of ethoxylation can be controlled by the amount of ethylene oxide which is added. Thus, a 1 mole, 2–4 mole, 5–8 mole or even up to 20 mole ethoxylate may be formed. The 3-alkenol ethoxylates of the invention can then be represented by the formula

where R is as defined above and $m$ is an integer from about 1 to 20. The preferred range is from about 2–8 moles. However, when sulfation of the ethoxylate is contemplated, a range of 1–4 moles is preferred. In general, it is preferred that the ratio of carbon atoms in R above to moles of ethoxylate be maintained at from about 1.25 to about 1.85. Typical ethoxylation temperatures range from about 125° C. to about 225° C. or more when the reaction is carried out at atmospheric pressures. When higher pressures are used, lower temperatures can be employed. At these lower temperatures, there is less tendency for undesired side reactions to occur.

Preferably, the 3-alken-1-ol ethoxylates of this invention retain the double bond between the 3 and 4 carbon atoms. Surprisingly, the presence of this double bond has been found to impart no deleterious properties to the ethoxylate. The presence of a double bond, of course, is often associated with poor storage stability of organic compounds. However, samples of the ethoxylate receiving full daylight exposure in clear glass bottles for several years showed no discoloration or odor development. The ethoxylates also show excellent foaming and dish washing ability when compared with saturated alcohol ethoxylates.

The ethoxylate may also be converted to a sulfate salt by well-known techniques such as sulfation with sulfamic acid or chlorosulfonic acid moderated by solution in ether. In general, sulfation with chlorosulfonic acid should take place at low temperatures, e.g., 5° C., in order to minimize involvement of the double bond. The unsaturated alcohol ethoxylate sulfates also show excellent wetting, foaming, and dishwashing ability when compared to their saturated counterparts.

The 3-alkene-1-ols and their ethoxylates can be converted to 1,3-glycols and the corresponding 1,3-glycol ethoxylates by reacting them in the presence of mercuric acetate. An intermediate oximercuri adduct which may be formed can be reduced to the glycols by the addition of alkaline sodium borohydride. This method of forming glycols is described by Brown and Geoghegan, J. Am. Chem. Soc., 89, 1522 (1967).

When this method is applied to the 3-alkene-1-ol, the yield of 1,3-glycol may be reduced due to a side reaction resulting in the formation of a 2-alkyl tetrahydrofuran. However, excellent yields are observed in the case where the ethoxylate is converted to the 1,3-glycol ethoxylate.

The 1,3-glycol ethoxylates are the equivalent of coconut oil derived diethanol amide with respect to foam and foam persistence.

The 3-alken-1-ol ethoxylates of the invention can be dihydroxylated to form saturated 3,4-dihydroxy alkanol ethoxylates. One method of accomplishing the dihydroxylation is treating of the ethoxylate with hydrogen peroxide in the presence of a low molecular weight organic acid. Although the temperature of the dihydroxylation reaction may vary, it is preferred that it be fairly carefully controlled. Thus, when formic acid is used, the temperature should be maintained in a range of about 35° to 50° C. and preferably in a range of about 40° to 45° C.

Finally, the 3-alken-1-ols of the invention can be converted to their respective sulfate salts by the same well known techniques referred to above in connection with the formation of alkenol ethoxylate sulfates. The alcohol sulfates so formed are useful wetting agents of predominant merit in cotton washing.

The invention is further described and illustrated in the following examples, in which all parts and percentages are by weight and all temperatures in degrees centigrade unless otherwise qualified.

EXAMPLE 1

This example illustrates the preparation of the preferred alcohol, 3-tridecen-1-ol, as well as other unsaturated alcohols within the scope of the invention.

(A) 3-tridecen-1-ol

The reaction was carried out in an unstirred pressure reaction bomb. The olefin, 1-dodecene, was placed in the bottom of the bomb adjacent to but not in actual contact with the paraformaldehyde which was used as the formaldehyde source. The paraformaldehyde was confined in an open glass dish also placed in the bottom of the bomb. The reaction was carried out at varying molar ratios and temperatures. Additionally, acetic anhydride was introduced into the reaction mixture for some of the runs. At the end of the reaction period, the bomb was cooled and the contents withdrawn and separated. The gaseous effluent contained hydrogen, carbon monoxide, carbon dioxide and methyl formate. The aqueous by-products contained water, methanol and traces of formic acid. The volatile components of the organic layer were removed by water aspiration and analyzed. The less volatile fraction was vacuum distilled and the distillate fractions analyzed to determine the extent of conversion and alcohol to formate ratio. The olefin alcohol was separated from its formate by saponification. Infrared spectroscopy and gas-liquid chromatography were used in analyzing the reaction products.

The 3-tridecen-1-ol was found to have a boiling point of 112° to 115° C. at 1.5 mm. pressure, a refractive index of $n_D^{20}$ 1.4548, a density of 0.8437, a hydroxyl number of 276 and a bromine number of 78.4. The infrared spectra showed strong absorption for primary hydroxyl and trans olefin. Specific reaction conditions and results obtained are set forth in Table I.

TABLE I

[Reaction parameters for 3-tridecen-1-ol]

| Run number | Temp. (° C.) | Time (hours) | Moles 1-dodecene | Moles HCHO | Ratio of alcohol to formate | Moles acetic anhydride | Percent yield on— Alkene consumed | Alkene charged | HCHO charged |
|---|---|---|---|---|---|---|---|---|---|
| 1 | 210 | 24 | 1.0 | 0.5 | 3:1 | | 73 | 10 | 20 |
| 2 | 220 | 6 | 1.0 | 1.0 | | 5.0 | 38 | 10 | 10 |
| 3 | 225 | 12 | 2.0 | 2.0 | | | 66 | 14 | |
| 4 | 225 | 12 | 2.0 | 2.0 | | 1.0 | 59 | 11 | |
| 5 | 245 | 12 | 1.0 | 1.0 | 1:4 | | 56 | 17 | 17 |
| 6 | 245 | 24 | 1.0 | 0.5 | | 0.5 | 66 | 25 | 50 |
| 7 | 245 | 48 | 1.0 | 0.5 | 1:1 | | 53 | 17 | 34 |
| 8 | 245 | 48 | 1.0 | 2.0 | 1:6 | | 52 | 21 | 11 |

(B) Preparation of other 3-alkene-1-ols

These reactions were carried out in a stirred laboratory autoclave equipped with automatic temperature control. The olefin, paraformaldehyde and acetic anhydride were placed together at room temperature in a glass liner which was then inserted into the heated and stirred autoclave. In general, the product workup and identification followed the scheme of part (A) above except that the product esters of this series were saponified (hot 30% caustic) prior to fractional distillation. The process conditions are summarized in Table II and the product properties in Table III.

TABLE II.—REACTION PARAMETERS FOR PREPARATION OF VARIOUS UNSATURATED ALCOHOLS

| Olefin | Temp. (° C.) | Time (hours) | Pressure (p.s.i.) | Moles olefin | Moles HCHO | Moles $Ac_2O$ | Olefin recovered, percent | Alcohol yield, percent olefin consumed |
|---|---|---|---|---|---|---|---|---|
| 1-decene | 250 | 8 | 800 | 2.5 | 2.5 | 1.5 | 52 | 47 |
| 1-tetradecene | 250 | 8 | 200 | 2.0 | 2.0 | 1.0 | 63 | 34 |

TABLE III.—PHYSICAL PROPERTIES OF VARIOUS UNSATURATED ALCOHOLS

| Alcohol | B.P., ° C. (mm.) | Refractive index (° C.) |
|---|---|---|
| 3-undecen-1-ol | 125–133 (16) | 1.4530 (19) |
| 3-pentadecen-1-ol | 150–151 (15) | 1.4585 (20) |

EXAMPLE 2

Ethoxylates of 3-tridecen-1-ol and others of the 3-alkene-1-ols prepared in Example 1 were prepared. Additionally, for comparative purposes, ethoxylates of unsaturated alcohols outside the scope of this invention were prepared, i.e., the ethoxylates of 3-hepten-1-ol [C. Agami, Compt. Rend, 255 (14) 1623, (15) 1753 (1962)], triisobutenyl carbinol [U.S. Pat. 2,624,766 to Butler], and 3-nonadecen-1-ol [N. O. Brace, J. Am. Chem. Soc., 77, 4666 (1955)].

(A) Ethoxylates of 3-tridecen-1-ol

Ethoxylation of 3-tridecen-1-ol of 97% purity was conducted as follows. A 0.15 mole portion of the 3-tridecen-1-ol was rigorously dried in an ethoxylation vessel with a warm, dry nitrogen sparge and then reacted in a nitrogen atmosphere with 0.2 gram of sodium metal. A slow stream of ethylene oxide was introduced below the surface of the stirred liquid at a temperature maintained between 160° and 170° C. Gas absorption was stopped after 90 minutes. The resulting adduct contained 2.7 moles of ethylene oxide per mole of alcohol. The product was a clear, colorless oil of refractive index $n_D^{25}$ 1.4577, surface tension of 32.1 dynes/cm. (0.1% solution in water at 25° C.). It was determined by chemical tests and infrared spectroscopy that the double bond in the alcohol portions of the ethoxylate had remained unaffected.

In a similar manner, an adduct corresponding to 6.9 moles of ethylene oxide per mole of 3-tridecen-1-ol was obtained from a 2.5 hour reaction at 160° to 170° C. in the presence of the sodium alcoholate catalyst. The product was a completely water soluble thin slurry of refractive index $n_D^{25}$ 1.4620, surface tension of 34.3 dynes/cm. and cloud point (1% solution) of 54° C.

(B) Ethoxylates of other unsaturated alcohols

Proceeding in the manner of part (A) above, ethoxylates of additional alcohols both within and without the scope of the invention were prepared. Thus, 3-undecen-1-ol was converted into a 5.5 mole ethoxylate and 3-pentadecen-1-ol into a 6.0 mole ethoxylate. Similarly, for sake of comparison, 3-hepten-1-ol was converted to a 2.7 mole ethoxylate, triisobutenyl carbinol into a 1.4 mole ethoxylate, and 3-nonadecen-1-ol into a 10 mole ethoxylate. These adducts were all clear water soluble liquids except for the $C_{19}$ alcohol ethoxylate which was solid at room temperature. The linear alcohols were ethoxylated with relative ease, while the branched triisobutenyl carbinol resisted ethoxylation and its ethylene oxide adduct was only partly water soluble and possessed a dark color and sharp odor. The ratio of alcohol carbon number to moles of ethoxylate for the linear alcohol ethoxylates ranged only from about 1.9 to about 2.6, affording adequate basis for comparison of relative detergent properties (Table IV, infra).

EXAMPLE 3

Ethoxylates prepared in Example 2 above were evaluated against commercial detergents for dishwashing performance according to the following procedure.

Into a three-quart mixing bowl in a constant temperature bath at 45° C. was placed 250 milliliters of water containing 150 p.p.m. calcium carbonate. Five milliliters of a sample of solution prepared by mixing 15 grams of sample in 150 milliliters of water were than added to the bowl. The resulting solution was then stirred rapidly with an electric mixer for one minute. The foam height in millimeters was then measured. The number of dishes which the solution could wash was determined by mixing equal volumes of Mazola oil and Wesson oil, adding 6 drops of mixture to the test solution and stirring rapidly with a mixer for one minute. The procedure was then repeated until the foam broke or until oil appeared on the surface of the water. One dish was equal to 6 drops of the oil mixture and the total number of dishes washed was equivalent to the number of 6 drop increments. The ethoxylates were evaluated against a well known commercial nonionic detergent, Tergitol 15-S-9, manufactured by Union Carbide Chemicals Co. and containing 10–15 carbon atoms and 9 ethoxylate groups and Calamide C, a coconut oil diethanol amine. The test compositions contained 20% sodium dodecyl benzene sulfonate, 6% sodium xylene sulfonate and 3% of either Tergitol, Calamide C, or 3-alkene-1-ol ethoxylate. In a control run, the composition contained only sodium xylene sulfonate and sodium dodecyl benzene sulfonate.

TABLE IV.—COMPARATIVE DETERGENCY

| Ethoxylate[1] | Initial foam height (mm.) | Total dishes | Surface tension, dynes/cm. (0.1% conc. 22° C.) |
|---|---|---|---|
| Exemplars of the invention: | | | |
| 3-undecen-1-ol-5.5 EO | 75 | 12 | 34.4 |
| 3-tridecen-1-ol-7 EO | 70 | 14 | |
| 3-pentadecen-1-ol-6 EO | 55 | 12 | 32.0 |
| Commercial detergents: | | | |
| Calamide C | 70 | 10 | |
| Tergitol | 70 | 14 | 33.0 |
| Other ethoxylates: | | | |
| 3-hepten-1-ol-2.7 EO | 65 | 4 | 45.2 |
| Triisobutenylcarbinol-1.4 EO | 55 | 5 | 33.5 |
| 3-nonadecen-1-ol-10 EO | 40 | 4 | 39.5 |
| Control | 50 | 5 | |

[1] Concentration 0.6% wt., water hardness 150 p.p.m., temperature 120° F.

It is apparent from Table IV that the ethoxylates of the invention compare favorably with the commercial detergents, while ethoxylates of the linear $C_7$ and $C_{19}$ alcohols and of the highly branched triisobutenyl carbinol performed no better than and in two cases worse than the control containing no ethoxylate at all. In all cases, the ethoxylates of the invention performed better than twice as well as those last mentioned.

EXAMPLE 4

This example demonstrates the sulfation of preferred ethoxylates of the invention.

The 2.7 mole 3-tridecen-1-ol ethoxylate prepared in Example 2 was converted to a sulfate salt as follows. Chlorosulfonic acid (0.06 mole) dissolved in diethyl ether was added to a stirred solution of the 2.7 mole ethoxylate of 3-tridecen-1-ol (0.05 mole) in chloroform. The reaction temperature was maintained at about 5° C. during the period of addition (40 minutes) then raised to room temperature and finally sparged with dry nitrogen to expel hydrogen chloride. Dry ammonia was bubbled through the contents until alkaline. The solvents were vacuum stripped to leave 27 grams of an off-white paste which was completely water soluble with production of large amounts of persistent foam. The surface tension of a 0.1% solution in water was 33.6 dynes/cm.

The ammonium sulfate salt of the 6.9 mole ethoxylate of 3-tridecene-1-ol was also prepared. To a stirred solution of 17 grams of the ethoxylate in 50 milliliters of chloroform was added 4.7 grams of chlorosulfonic acid in 25 milliliters of diethyl ether at 5–10° C. The contents were allowed to warm up to room temperature and then blown with a slow stream of nitrogen to reduce the hydrogen chloride present. Then dry nitrogen gas was bubbled in until the contents were neutralized. After solvent evaporation the residue was dissolved in about two parts of water to produce a clear colorless aqueous solution of the ammonium sulfate salt of 3-tridecen-1-ol ethoxylate (about 95% yield based on hyamine titration) which produced copious foam on shaking.

An attempt to convert the 1.4 mole ethoxylate of triisobutenyl carbinol of Example 2 into an ammonium sulfate by this same procedure led to degradation of the ethoxylate and no production of sulfate derivative.

EXAMPLE 5

Sulfates of various 3-alkene-1-ols of the invention are prepared and their wetting properties evaluated. Soil removal properties of the preferred 3-alkene-1-ol sulafte are then compared with those of commercial detergents.

The 3-tridecene-1-ol was sulfated by reacting it with sulfamic acid in the presence of pyridine at a temperature of about 110°–130° C. for one hour. The product pyridonium sulfate was converted, with soda ash, to a sodium salt which was purified by recrystallizing from methanol.

Similarly, water soluble sulfate derivatives were prepared from 3-undecen-1-ol and 3-pentadecen-1-ol. These sulfates were then demonstrated to be efficient wetting agents by surface tension measurement. Thus, at 0.1% wt. concentration in water (22° C.), these sulfates respectively exhibited surface tension of 38.9 and 30.4 dynes/cm.

The 3-tridecen-1-ol sulfate was evaluated by incorporating it in a detergent composition containing 25% by weight of the 3-tridecen-1-ol sulfate, 45% tri-sodium phosphate, 7% sodium silicate, 20% sodium sulfate and 3% carboxy methyl cellulose. For comparison in separate runs, the sulfate salt of 3-tridecene-1-ol in the above composition was replaced by two other detergents: sodium dodecyl benzene sulfonate and sodium lauryl sulfate.

The detergency of the compositions was determined by measuring soil removal and soil deposition from 6″ x 6″ cotton swatches containing a standard carbon soil (United States Testing Company, Inc.). Six swatches, three soiled and three unsoiled, were placed in a testing washing machine (Terg-O-Tometer) which contained blades rotating at a speed of 150 r.p.m. The washing time was 15 minutes followed by two 5-minute rinses. The water temperature used was 120° F. with a water hardness of 150 p.p.m. 0.4% by weight of the test detergent was incorporated into the washing water.

The swatches of material were subjected to reflectometer measurements before and after washing. Percent soil removal was determined based upon the difference between the original reflectometer reading and final reflectometer reading. The redeposition index is the percent of reflectivity based on reflectometer reading on unsoiled swatches after washing to the reading before washing. The results are set forth below in the table.

TABLE V

| Sample | Percent soil removal | Redeposition index |
|---|---|---|
| Sodium sulfate salt of 3-tridecen-1-ol | 32.5 | 97.4 |
| Sodium dodecyl benzene sulfonate | 17.9 | 96.6 |
| Sodium lauryl sulfate | 28.7 | 98.2 |

It can be seen that the 3-tridecene-1-ol sulfate compares quite favorably with present commercial detergents.

EXAMPLE 6

An ethoxylate of a preferred 3-alken-1-ol of the invention, 3-tridecen-1-ol, was evaluated for biodegradability. For comparison, two compounds outside the scope of the invention were also tested: triisobutenyl carbinol and a 10 mole ethoxylate of 3-nonadecen-1-ol. Because the ethoxylate-alkanol bond is quickly broken, the comparison is not affected by absence of ethoxylation from the triisobutenyl carbinol. The evaluations were conducted by an independent testing laboratory using the Shake-Flask Bacterial Culture Method ("Soap and Detergent Association's Interim Procedure," Soap and Chemical Specialties, vol. XLI, No. 4, 1965).

The three compounds were investigated in the form of anionic sulfate salts so the rate of their disappearance in the activated sludge sub-culture could be accurately determined by the standard methylene blue photocolorimetric procedure (Soap and Detergent Association, Standard Methods for the Examination of Water and Wastewater (1960), pp. 246–248).

Samples were removed from the media of the shake flask for analysis of MBAS (methylene blue anionic active-substance) on day zero and on the 7th and 8th days of the test with the following results:

TABLE VI.—BIODEGRADATION OF 3-ALKEN-1-OLS

| Compound: $NH_4^+$ sulfate of— | Day of test | Percent MBAS biodegraded | Average of days 7 and 8 |
|---|---|---|---|
| 3-tridecen-1-ol-7 EO | Initial 7 8 | 0.0 80.0 82.9 | 81.4 |
| 3-nonadecen-1-ol-10 EO | Initial 7 8 | 0.0 63.2 78.9 | 71.0 |
| Triisobutenyl carbinol | Initial 7 8 | 0.0 17.6 17.6 | 17.6 |

It should be noted that, by the definition of the Soap and Detergent Association, to be characterized as "biodegradable," a compound must biodegrade 80% or more in the shake flask test. Table VI demonstrates that the tridecanol compound is "biodegradable," whereas neither the triisobutenyl carbinol nor the nonadecenol compound is "biodegradable."

EXAMPLE 7

This example illustrates dihydroxylation of a 3-tridecen-1-ol ethoxylate. An ethoxylate of 97% purity was prepared by rigorously drying a 0.15 mole portion of 3-triden-1-ol in an ethoxylation vessel with a warm, dry nitrogen sparge and then reacting in a nitrogen atmosphere with 0.2 gram of sodium metal. A slow stream of ethylene oxide was introduced below the surface of the stirred liquid at a temperature maintained between 160° and 170° C. Gas absorption was stopped after 90 minutes. The resulting adduct contained 2.7 moles of ethylene oxide per mole of alcohol. The product was a clear, colorless oil of refractive index $n_D^{25}$ 1.4577, surface tension of 32.1 dynes/cm. (0.1% solution in water at 25° C.). It was determined by chemical tests and infrared spectroscopy that the double bond in the alcohol portions of the ethoxylate had remained uneffected.

To 0.038 mole of the olefin alcohol ethoxylate dissolved in 20 grams of formic acid was added 0.05 mole of 30% hydrogen peroxide. The reaction temperature of 40° to 45° C. was held for one hour. Neutralization of solvent acid and saponification of product formyl ester was accomplished by slow addition of 30% caustic soda at less than 45° C. The organic layer was taken up in diethyl ether, dried and evaporated to yield 11.2 grams of clear oil having a refractive index $n_D^{25}$ 1.4617, 1% cloud point of 46° C. and surface tension of 32.2 dynes/cm. (0.1% solution at 24° C.). The product was readily soluble in water to produce a fast breaking low foam.

Having fully described our invention with emphasis upon the preferred embodiments thereof, we wish it understood that our invention is not limited thereto, but only to the lawful scope of the appended claims.

What is claimed is:

1. Ethoxylate of formula $$R-CH=CH-CH_2-CH_2(O-CH_2-CH_2)_mOH$$

wherein R is a linear alkyl group having from 7 to 11 carbon atoms and $m$ is an integer from about 1 to 20.

2. Ethoxylate according to claim 1 wherein the ratio of carbon atoms in R to the integer $m$ is from about 1.25 to about 1.85.

3. Ethoxylate according to claim 1 wherein R is n-nonyl.

References Cited

UNITED STATES PATENTS

| 2,133,480 | 10/1938 | Schoeller et al. | 260—615 B |
| 2,979,533 | 4/1961 | Bruson et al. | 260—615 B X |
| 3,129,231 | 4/1964 | Tinsley et al. | 260—615 B X |
| 2,624,766 | 1/1953 | Butler | 260—615 B |

OTHER REFERENCES

Kramer et al.: Chem. Abst., 71, 49171m, 1969.

HOWARD T. MARS, Primary Examiner

U.S. Cl. X.R.

252—89, 351, 353, 551; 260—346.1 R, 458, 615 R, 632 R, 635 R, 638 R

UNITED STATES PATENT OFFICE
CERTIFICATE OF CORRECTION

Patent No. 3,778,479     Dated December 11, 1973

Inventor(s) Morrisroe, John J.; Banigan, Thomas F.

It is certified that error appears in the above-identified patent and that said Letters Patent are hereby corrected as shown below:

Claim 3, line 1, "A ethoxylate" should read "An ethoxylate"

Claim 4, line 1, "A ethoxylate" should read "An ethoxylate"

Claim 5, line 1, "A ethoxylate" should read "An ethoxylate"

Signed and sealed this 30th day of July 1974.

(SEAL)
Attest:

McCOY M. GIBSON, JR.        C. MARSHALL DANN
Attesting Officer           Commissioner of Patents